Mar. 13, 1923.
H. E. BRUNNER
ANTIFRICTION BEARING
Filed Oct. 31, 1919
1,448,189
2 sheets-sheet 2

Inventor
Harold E. Brunner.
By his Attorneys
Rogers, Kennedy & Campbell.

Patented Mar. 13, 1923.

1,448,189

UNITED STATES PATENT OFFICE.

HAROLD E. BRUNNER, OF LARCHMONT, NEW YORK, ASSIGNOR TO THE HESS-BRIGHT MANUFACTURING COMPANY, A CORPORATION OF DELAWARE.

ANTIFRICTION BEARING.

Application filed October 31, 1919. Serial No. 334,772.

*To all whom it may concern:*

Be it known that I, HAROLD E. BRUNNER, a citizen of the United States, residing at Larchmont, in the county of Westchester and State of New York, have invented certain new and useful Improvements in Antifriction Bearings, of which the following is a specification, reference being had therein to the accompanying drawing.

This invention relates to anti-friction bearings and has for an object to provide an improved construction for distributing the axial load between a plurality of bearings, and to a compensating structure for becoming effective in such distribution upon the application of a pre-determined amount of axial thrust of the shaft. In another aspect of the invention, one of a number of bearings, (for simplicity of description, a unit of two bearings and an equalizing device is being considered) sustains the axial load up to the pre-determined amount, and the other of these bearings supports the radial load. Upon the application of further load, this other bearing becomes active and assumes a part of the axial load throughout a limited range, which being exceeded, the load is then substantially uniformly divided between the two bearings. If the unit contains a greater number than two bearings, the load is distributed in pre-determined amounts to the bearings in sequence, whereby these become progressively active until the entire load is substantially uniformly divided among them all. The present practice among the better engineers of accurately ascertaining the normal and shock loads to be carried by the supported shaft or other rotary part and the speeds of rotation which are attained at these various load conditions will, of course, be followed in selecting the type and size of ball bearings and strength and character of spring.

This invention, while capable of use in connection with the rotating part thrusting axially in any angular direction, is particularly adapted for use in connection with vertically disposed shafts from which heavy axial loads are suspended, an instance being the shaft for driving a deep well pump. In passing it may be noted that the limiting factor of speed is the limit of speed of the bearings employed.

Figure 1:
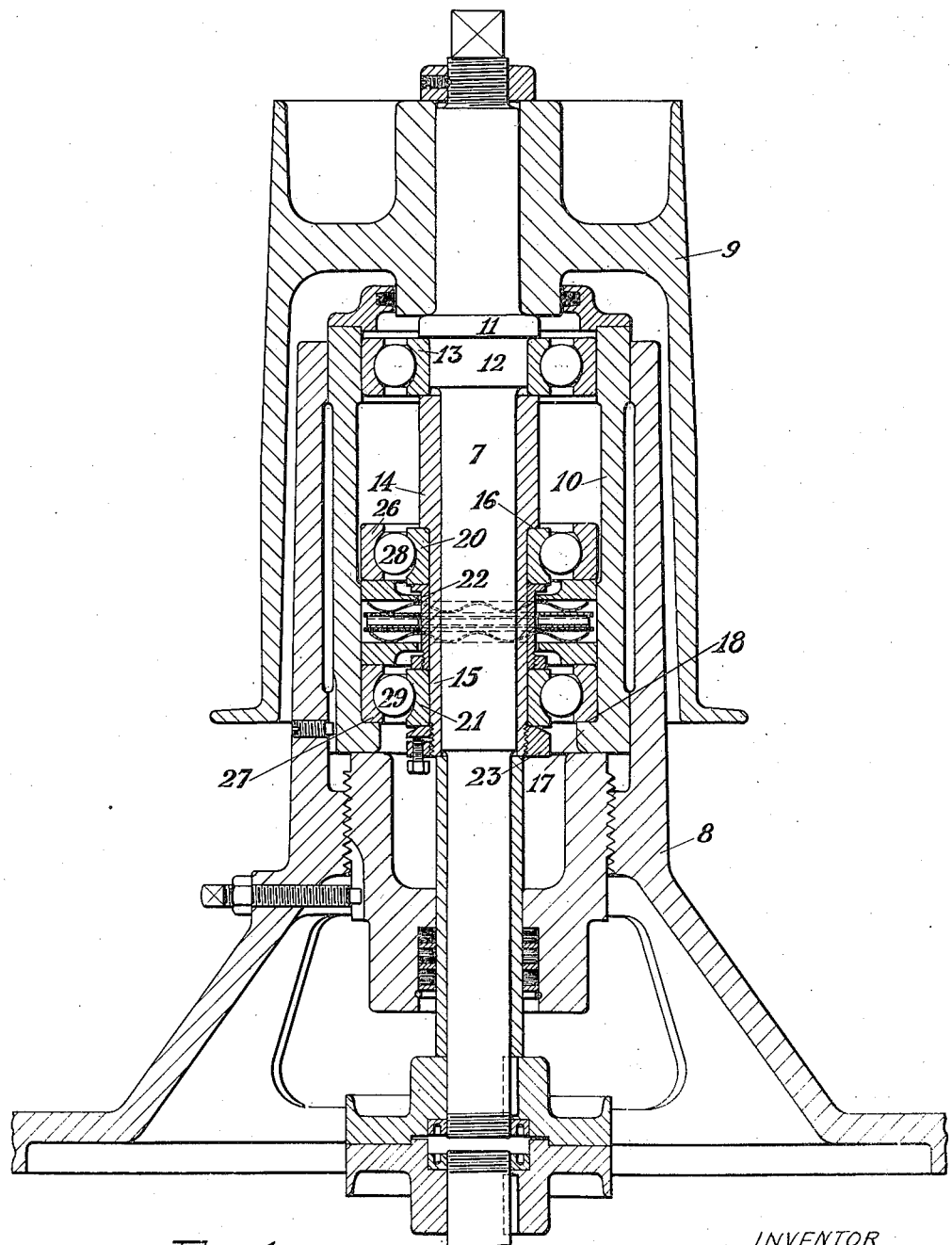

In the drawings accompanying this specification, one practicable embodiment of the invention is illustrated, in which drawings Figure 1 shows in central vertical section a well pump installation containing an example of my improved compensating device.

Figure 2:
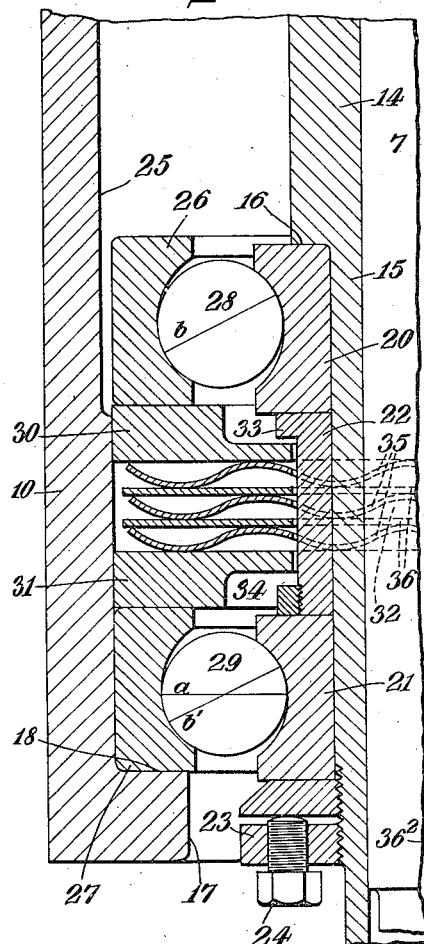
Figure 3:
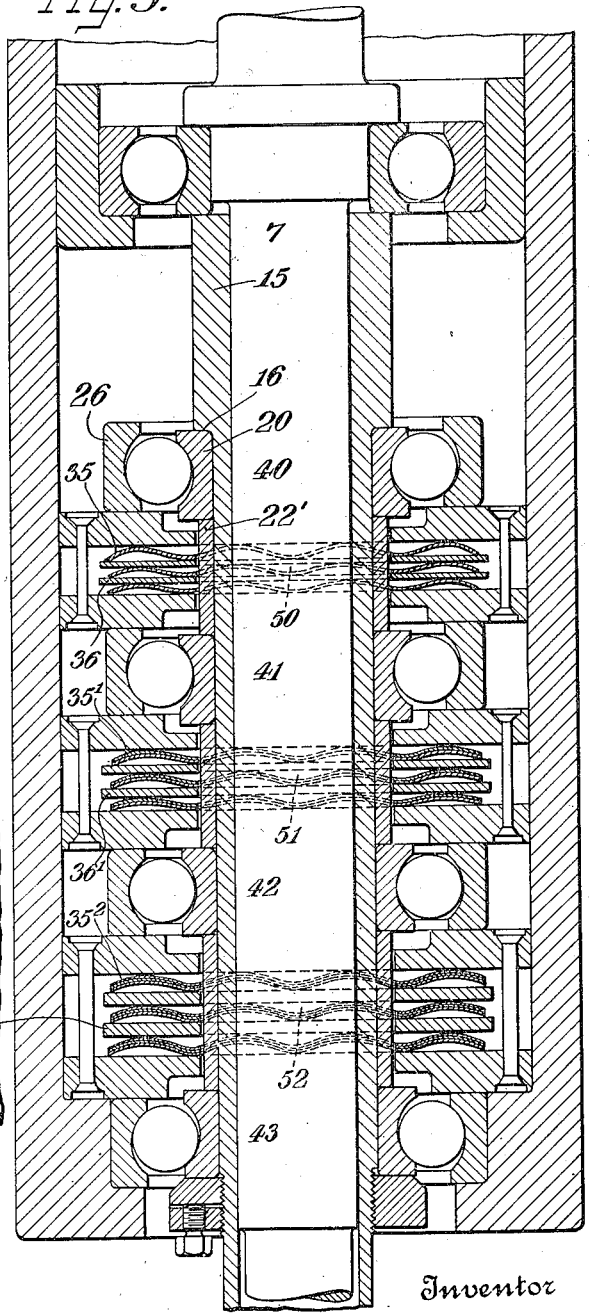

Figure 2 is an enlarged detail of a portion of the bearing illustrated in Fig. 1, and Fig. 3 is a view in central vertical section of another installation, including a greater number of ball bearings than are shown in the Fig. 1 construction.

The drawings herein illustrate my invention applied to the shaft 7 of a deep well pump. The term "vertical" as well as other terms of direction, are employed for convenience, since it is perfectly obvious that this illustrated disposition of the axis of the supported shaft is but an example of the invention in its broader aspects. The various parts of the device are shown mounted in a general housing 8 supported in some convenient manner. The shaft has fast upon it a pulley 9. Within the housing 8 is mounted a vertically adjustable shell 10, inside which are shown disposed the elements of the improved compensating bearing. The lower end of the flange of the pulley 9 is shown overhanging the thrust bearing and compensating construction presently to be described.

The shaft 7 is shown provided near its upper end with a shoulder 11 and an enlarged seat 12, upon which seat and abutting which shoulder there is shown mounted the inner ring 13 of a radial ball bearing. The portion of the shaft 7 below the enlargement 12 and within the shell 10 is preferably surrounded by a sleeve 14 fast on the shaft. The lower portion 15 of this sleeve is of reduced outside diameter, such reduction being abrupt and affording a downwardly facing shoulder at 16. The lower end of the shell 10 is provided with an inwardly directed flange 17 forming an upwardly facing shoulder 18. The thrust bearing structure per se can, if desired, be made up in the form of a self-contained handling unit. As a further segregation into the component elements, the elastic resistance device, presently to be described, can also be made up as a self-contained handling unit, and thereby constitute a separate replacement part.

In order to carry out my invention whereby the axial load of a shaft will be distributed between two thrust sustaining bearings, I provide elastic means of pre-determined resistance between the thrust receiving parts. In the Fig. 1 and 2 construction there are shown two ball bearings of that deep groove type which are capable of sustaining in addition to the radial load, thrust or axial load in both directions. The inner rings 20, 21 of these bearings are shown mounted upon the portion 15 of the sleeve surrounding the shaft 7. These rings are shown held at the proper distance apart by a sleeve 22, the upper of which rings 20, is held against the shoulder 16 and the rings and sleeve locked together by means of an adjustable clamping device, in the present instance a nut 23, split, and having a set screw 24 for spreading the tread out of its normal spirals. The inside of the shell 10 is shown enlarged as at 25 so as to clear the outer ring 26 of the upper ball bearing. The ring 27 of the lower ball bearing is shown resting upon the shoulder 18, and is assumed to have the usual creeping fit permitted outer rings of this type of ball bearing. A suitable set of balls 28 is shown mounted between the rings 20 and 26 and a similar set 29, between the rings 21 and 27. The part designated by the reference character 22 performs two functions, a separator for the inner rings and a mounting for the spring. To avoid confusion which might result from giving it a functional name, it is meredy called a sleeve.

The lower bearing is so located that it takes a certain amount of radial load in addition to the thrust load. The upper bearing, however, is so mounted that it cannot afford radial support to the shaft. The initial tension applying and equalizing device is illustrated mounted between these ball bearings above described and surrounding the sleeve 22, which forms a part of the same and is instrumental in enabling the same to be constructed as a self-contained handling unit. There are shown two plates, 30 and 31 (see enlarged detail Fig. 2) plate 30 being below the ring 26 and in engagement therewith, and the plate 31 above the ring 27 and in engagement therewith. These plates are also shown having a creeping or sucking fit with the interior of the sleeve 10. Between these plates 30 and 31 there is mounted a stiff compression spring 32, the details of the illustrated form of which will be described later. The sleeve 22 is provided at one end with a flange 33, forming a shoulder for limiting the outward movement of one of the plates. The other end of the sleeve is screw threaded for receiving a screw ring 34 which affords a shoulder for preventing outward movement of the other plate. The plates 30 and 31 should preferably be cut away at the region of these shoulders so that the overall dimensions of the device may be reduced thereby. These shoulders limit the outward movement of the plates responsive to the expansion of the spring 32, and hold the parts assembled and the spring in initial compression so that the device may be readily assembled with the parts with which it is to co-operate.

The form of compression spring which I have found useful in practice is made up of a series of corrugated and plane plates. There is shown in Fig. 2 a plurality of corrugated plates 35 and located between the adjacent corrugated plates are plane plates 36. In the present illustration the sinuosities of each plate run in substantially straight parallel lines. In many installations it has been found desirable to arrange these plates so that the summits of the upward bends come one over the other, and the summits of the downward bends one over the other. This gives a certain uniformity of flexure to the plates, particularly the plane plates, a crosswise disposition however being shown in Fig. 1.

Assuming that the shaft 7 transmits to the thrust bearing a load of 40,000 pounds, the spring 32 is constructed with such initial tension that compression thereof cannot be effected until there is applied to the plate 30 a load of 20,000 pounds. Under that condition, which however is not the condition illustrated in the drawing, the set of balls 28 of the upper ball bearing carries the thrust load up to 20,000 pounds in the following manner. From the shaft 7, sleeve 15, shoulder 16, ring 20, ball 28, ring 26, plate 30, unyielding spring 32, plate 31, ring 27, shoulder 18. Upon the addition of load in excess of 20,000 pounds, the spring 32 is compressed. This permits the ring 26 to move downwardly relatively to the ring 20. This relative movement of the rings 20, 26, changes the relation of the rings 21, 27 so that the ring 21 is moved downwardly, in fact the relative positions of all the rings change. The change in relation of the rings 21 and 27 places the parts in the positions shown in Figs. 1 and 2 and brings the axis of ball contact, of ball 29, from the horizontal position represented by the line $a$ to an oblique position $a'$ similar to that represented by the axis $b$ of the ball 28. When the two balls 28 and 29 assume such positions that their axes are oblique and in parallel relationship, the thrust load is then uniformly divided between them.

When there is no axial load upon the bearing, both outer rings are pressed away from each other toward their respective ends of the structure. In the illustrations just described as well as that of Figure 3, each of the ball bearings which are mounted in tandem is shown moved into proper position for supporting its proportionate share of the axial load.

In Figure 3 there is illustrated an installation of my improved thrust supporting device embodying combined radial and thrust anti-friction bearings, and elastically yieldable compensating means for distributing the load whereby the bearings become operative in succession in accordance with the load placed upon the device. In this figure there is assumed to be no load upon the device, or at the most a very small amount of load on the shaft 7. In this figure the plates of the spring units are shown held together by a series of stay bolts 220, preferably located toward their outer edges. The intermediate sleeve 22' is entirely free of such plates and springs, and in this instance acts merely as a spacer between the inner rings of the bearings. By this means when there is no compression upon the spring units, other than their internal initial compression, friction is not exerted between the plates and the sleeves, but these plates are free to remain stationary with the supporting housing 10 irrespective of the amount of load carried by the device. This figure also illustrates a manner in which the type of spring herein illustrated may be stiffened at its progressive stations without requiring any additional kind of corrugated part. In this manner practically the entire structure is interchangeable; that is, the parts of the bearings at the stations 40, 41, 42 and 43 are interchangeable as are also the intermediate spring containers, and the springs or their constituent elements at the spring positions 50, 51 and 52. The spring at position 50 is made up somewhat similar to the spring shown in Figs. 1 and 2. The spring at position 51 has double corrugated plates and the spring 52, which has to support not only the load from the station 42 but also that of the load from stations 40 and 41, has triple corrugated plates, that is, three single plates put together. At the position 50, the plane plates 36 are substantially the same thickness of metal as are the corrugated plates 35. At 51, the plane plates 36' are of increased thickness to resist the bending effect of the strengthened double corrugated plates 35', and at 52 the plates 36² are made still thicker and stiffer to withstand the bending effect of the further increased corrugated plates 35².

By way of illustration it will be assumed that the spring at position 50 has an initial compression of 20,000#, the spring at 51 has an initial compression of 40,000#, and that at 52 an initial compression of 60,000#. Until there is a sufficient load placed upon the shaft 7 to overcome the initial compression at the spring position 50 the load is borne as follows: from shoulder 16 on sleeve 15 to the inner ring 20 of the bearing 40 through the balls of such bearing to its outer race ring 26 to the plate 30', of the first spring unit, and then through the underlying race rings and uncompressed spring units to the shoulder 18 of the supporting housing 10. When the load upon the shaft 7 increases to an amount to overcome the initial compression of the first spring unit sufficiently to permit the outer ring of the bearing 40 to yield downwardly and thereby permit the sleeve 18 and the rigidly connected series of inner rings to yield downwardly, the pressure or load is then distributed between the two upper bearings 40 and 41 and is communicated to the outer race of the bearing 41, and through the underlying uncompressed springs at positions 51 and 52. This position will be maintained until the load is further increased to an amount sufficient to overcome the initial compression of the spring at station 51. When this is exceeded the bearing 42 then assumes its proportionate share of the load and the three bearings 40, 41 and 42 sustain the thrust load, and the bearing 43 is at this time running idle in so far as axial load is concerned. Upon the load then increasing again sufficient to overcome the initial compression at the spring at the lowermost position, a proportionate amount of the load is placed upon the lowermost bearing. In this manner it is obvious that the bearings become operative in succession in accordance with the load placed upon the shaft 7. When the shaft receives the full amount of predetermined load the bearings are uniformly loaded, or the load may be regarded as uniformly distributed among them.

In the preferred form of the invention the outer race rings of the bearings, so far as rotation is concerned, remain substantially stationary as do also the springs and the plates interposed between these and the outer race rings.

It will be apparent that such changes may be made in the details of construction and in the choice of the form of the individual bearing members and of the spring, as are necessary to meet the requirements of particular installations, provided the same come within the scope of the claims, without departing from the spirit of my invention.

I claim as my invention:

1. A thrust supporting device comprising a plurality of anti-friction bearings and elastically yieldable compensating means for distributing the load, whereby the bearings become operative in succession in accordance with the load placed upon the device.

2. A thrust supporting device comprising a plurality of ball bearings arranged in tandem and elastically yieldable means interposed between the same for distributing the load in predetermined amounts to the bearings, whereby in accordance with the load placed upon the device the bearings become operative in succession.

3. In a device of the character specified, the combination with a supported member, of a supporting member surrounding the same, a plurality of ball bearings, each having its inner race ring mounted upon the supported member and fixed thereon for longitudinal movement therewith, the outer race rings of the said bearings being capable of a limited amount of movement longitudinally in respect of the supported member, means on the supporting member for engaging the last of the series of outer rings, and elastically yieldable means disposed between the said outer rings whereby, upon application of load, the same is distributed in pre-determined amounts to the bearings in sequence.

4. In a device of the character specified, the combination with a rotary member adapted to thrust in one direction, a plurality of ball bearings surrounding the same and having their inner rings spaced apart and mounted for rotary and axial movement with the said supported member, compression springs of pre-determined strength between the outer rings of the said ball bearings, and means engaging the outer race ring at the end of the series in the direction of axial thrust for supporting the same.

5. The combination with a rotary and axially thrusting member, of a series of deep groove annular ball bearings having their inner rings mounted upon the said member, spaced apart, and fast with the same to move therewith, a spring member interposed between the outer race rings of the adjacent ball bearings in the space therebetween, each of these said spring members being of progressively greater strength in the stations between the respective bearings, and means for supporting the outer race ring of the last of the series against axial movement.

6. A replacement unit for a compensating bearing, comprising a sleeve having outwardly projecting flanges, a pair of plates mounted between said flanges, and a spring under compression surrounding the said sleeve and disposed between the said plates.

7. A replacement unit for a device of the character specified, comprising a sleeve having shoulders at its respective ends, plates surrounding the said sleeve and located between said shoulders, the plates being recessed whereby the outer faces thereof are substantially in the plane of the outer ends of the sleeve, and a spring under a pre-determined amount of compression surrounding the said sleeve and located between the said plates.

8. In a ball bearing, the combination with a member adapted to rotate and thrust axially, of a pair of annular ball bearings having their inner race rings mounted upon the said member and spaced apart, a stiff compression spring located between the outer race rings of the said bearings, and a housing surrounding the said bearings, said housing having a shoulder for supporting the outer race ring of one of the bearings and having a close fit with the outer periphery thereof, the outer race rings of the other said bearings being free from engagement with the said housing.

9. In a device of the character specified, the combination with a rotary and reciprocatory member, of a pair of annular ball bearings having their inner race rings mounted thereon, spaced apart, and adapted to move therewith, a pair of plates located between the outer race rings of the said ball bearings, a stiff compression spring disposed between the said plates, a housing surrounding the said bearings and provided with an abutment for supporting the outer race ring of one of the bearings, said housing adjacent said support affording a close fit for the said outer race ring and for the said plates, the outer race ring of the other of said bearings being free from engagement with the said housing.

10. An axial thrust supporting device comprising a pair of combined radial and thrust ball bearings arranged in tandem, the race rings of each such bearing being capable of a limited relative axial movement, and a spring under initial tension interposed between the bearings, and active upon both.

11. An axial thrust supporting device comprising a plurality of combined radial and thrust ball bearings arranged in tandem, the race rings of each such bearing being capable of a limited relative axial movement, and springs under initial load interposed between the ball bearings, each spring being active upon the bearings between which it is located.

12. A thrust supporting device comprising a plurality of ball bearings arranged in tandem, and springs interposed between the ball bearings, the spring being of progressively increasing strength, and being under initial load of progressive magnitude.

In testimony whereof, I have affixed my signature hereto.

HAROLD E. BRUNNER.